United States Patent
Kaneko (10) Patent No.: US 10,875,976 B2
(45) Date of Patent: *Dec. 29, 2020

(54) HEAT-CURABLE RESIN COMPOSITION, PREPREG, AND METHOD FOR PRODUCING FIBER-REINFORCED COMPOSITE USING EACH OF SAME

(71) Applicant: TOHO TENAX CO., LTD., Tokyo (JP)

(72) Inventor: Toru Kaneko, Shizuoka (JP)

(73) Assignee: TOHO TENAX CO., LTD., Tokyo (JP)

( * ) Notice: Subject to any disclaimer, the term of this patent is extended or adjusted under 35 U.S.C. 154(b) by 243 days.

This patent is subject to a terminal disclaimer.

(21) Appl. No.: 15/037,358

(22) PCT Filed: Nov. 21, 2014

(86) PCT No.: PCT/JP2014/080869
§ 371 (c)(1),
(2) Date: May 18, 2016

(87) PCT Pub. No.: WO2015/080035
PCT Pub. Date: Jun. 4, 2015

(65) Prior Publication Data
US 2016/0280871 A1    Sep. 29, 2016

(30) Foreign Application Priority Data

Nov. 26, 2013  (JP) ................................. 2013-243851

(51) Int. Cl.
C08J 5/24      (2006.01)
C08L 63/00     (2006.01)
C08L 101/00    (2006.01)
C08L 33/12     (2006.01)
C08L 33/06     (2006.01)
(Continued)

(52) U.S. Cl.
CPC ............... *C08J 5/24* (2013.01); *B29C 65/02* (2013.01); *B29C 70/12* (2013.01); *B29C 70/342* (2013.01);
(Continued)

(58) Field of Classification Search
None
See application file for complete search history.

(56) References Cited

U.S. PATENT DOCUMENTS 4,404,356 A * 9/1983 Andrews ............ C08G 59/4021
525/504
2006/0035088 A1 2/2006 Takano et al.
(Continued)

FOREIGN PATENT DOCUMENTS

EP    1 522 549 A1    4/2005
EP    1522549 A1  *  4/2005  ............... C08J 5/04
(Continued)

OTHER PUBLICATIONS

International Search Report dated Jan. 22, 2015, dated Feb. 24, 2015.
(Continued)

*Primary Examiner* — Rachel Kahn
*Assistant Examiner* — Ha S Nguyen
(74) *Attorney, Agent, or Firm* — Norris McLaughlin, P.A.

(57) ABSTRACT

The present invention provides a heat-curable resin composition, which comprises (1) a heat-curable resin mixture comprising a heat-curable resin (a) and thickener particles (b) and exhibiting a viscosity (150° C.) after having been held at a temperature of 150° C. for 30 seconds that is a viscosity (S), and (2) a curing agent, and is characterized in that the heat-curable resin composition exhibits a lowest viscosity (R) at 80-120° C., the lowest viscosity (R) is 0.1-10 Pa·s, and the viscosity (S) and lowest viscosity (R) satisfy the relationship of formula (1):

$5 < S/R < 200$    formula (1).

7 Claims, 4 Drawing Sheets

(51) Int. Cl.
| | |
|---|---|
| *C08G 59/40* | (2006.01) |
| *B29C 65/02* | (2006.01) |
| *B29C 70/12* | (2006.01) |
| *B29C 70/34* | (2006.01) |
| *B29C 70/44* | (2006.01) |
| *C08J 5/04* | (2006.01) |
| *C08L 31/02* | (2006.01) |
| *C08L 63/04* | (2006.01) |
| *B29K 663/00* | (2006.01) |

(52) U.S. Cl.
CPC .......... *B29C 70/44* (2013.01); *C08G 59/4021* (2013.01); *C08J 5/042* (2013.01); *C08L 31/02* (2013.01); *C08L 33/06* (2013.01); *C08L 33/12* (2013.01); *C08L 63/00* (2013.01); *C08L 63/04* (2013.01); *C08L 101/00* (2013.01); *B29K 2663/00* (2013.01); *C08J 2331/02* (2013.01); *C08J 2363/00* (2013.01); *C08J 2363/02* (2013.01); *C08J 2363/04* (2013.01); *C08J 2431/02* (2013.01); *C08J 2433/00* (2013.01); *C08J 2433/06* (2013.01); *C08J 2463/02* (2013.01); *C08L 2205/02* (2013.01); *C08L 2205/025* (2013.01); *C08L 2205/03* (2013.01); *C08L 2205/035* (2013.01)

(56) References Cited

U.S. PATENT DOCUMENTS

| | | |
|---|---|---|
| 2008/0152921 A1 | 6/2008 | Kropp |
| 2009/0198012 A1 | 8/2009 | Sakata et al. |
| 2014/0100320 A1 | 4/2014 | Nagano et al. |

FOREIGN PATENT DOCUMENTS

| | | | | |
|---|---|---|---|---|
| EP | 2 017 296 A1 | | 1/2009 | |
| EP | 2017296 A1 | * | 1/2009 | .............. B32B 3/12 |
| JP | 4-277550 A | | 10/1992 | |
| JP | H08-302278 A1 | | 11/1996 | |
| JP | 11-199755 A | | 7/1999 | |
| JP | 2001-207020 A | | 7/2001 | |
| JP | 2003-002952 A | | 1/2003 | |
| JP | 2003049050 A | | 2/2003 | |
| JP | 2004-099814 A | | 4/2004 | |
| JP | 2005-213352 A | | 8/2005 | |
| JP | 2005239921 A | * | 9/2005 | |
| JP | 2008-007682 A | | 1/2008 | |
| JP | 2009-292976 A | | 12/2009 | |
| JP | 2009-292977 A | | 12/2009 | |
| JP | 2010047717 A | * | 3/2010 | |
| JP | 2010-248379 A | | 11/2010 | |
| JP | 2013-023511 A | | 2/2013 | |
| JP | 2013157205 A | * | 8/2013 | |
| KR | 20090100366 A | | 9/2009 | |
| WO | 2004/48435 A | | 6/2004 | |
| WO | 2008/001705 A1 | | 1/2008 | |
| WO | 2010/035859 A1 | | 4/2010 | |

OTHER PUBLICATIONS

English Translation of International Search Report dated Jan. 22, 2015, dated Feb. 24, 2015.

Translation of Office Action dated Jul. 30, 2020, in connection with Korean Patent Application No. 10-2016-7012736.

* cited by examiner

HEAT-CURABLE RESIN COMPOSITION, PREPREG, AND METHOD FOR PRODUCING FIBER-REINFORCED COMPOSITE USING EACH OF SAME

This application is a 371 application of PCT/JP2014/080869 filed Nov. 21, 2014, which claims foreign priority benefits under 35 U.S.C. § 119 of Japanese Application No. 2013-243851 filed Nov. 26, 2013, the disclosures of each of which are incorporated by reference herein in their entirety.

TECHNICAL FIELD

The present invention relates to a heat-curable resin composition, a prepreg formed by impregnating a reinforced fiber material with this heat-curable resin composition, and a method for producing a fiber-reinforced composite using this prepreg. Particularly, the present invention relates to a prepreg suitable for high-cycle press molding and a method for producing a fiber-reinforced composite using the same.

BACKGROUND ART

A fiber-reinforced composite (hereinafter, also referred to as "FRP") has a light weight, a high strength, and a high rigidity, and is therefore used in various fields, for example, in a sports and leisure application such as a fishing rod or a golf shaft or an industrial application such as an automobile or an aircraft. An FRP is suitably produced using a prepreg formed by impregnating a reinforced fiber material layer with a resin. That is, an FRP is produced by cutting a prepreg into a desired shape, then shaping the prepreg, and heating the prepreg in a molding die to cure a resin included in the prepreg. However, in general, it takes a long time for molding a prepreg using an epoxy resin, and therefore is not suitable for producing apart requiring mass productivity, such as an automobile part.

Meanwhile, high-cycle press molding performed at a high temperature and a high pressure is often utilized in producing an automobile part due to high productivity thereof. Patent Literature 1 describes a method for molding a prepreg by high-cycle press molding.

In high-cycle press molding, usually, high-temperature and high-pressure conditions of 100 to 150° C. and 1 to 15 MPa are used. The high-temperature and high-pressure conditions can reduce time for curing a resin included in a prepreg. In addition, a gas included in a prepreg can be discharged by making a resin included in the prepreg flow appropriately in a molding die. However, when press molding is performed under high-temperature and high-pressure conditions, the temperature of a resin included in a prepreg is raised, and the resin viscosity is decreased significantly. As a result, some structures of a molding die cause severe outflow of a resin from a shear edge part (hereinafter, a phenomenon in which a resin flows out from a prepreg by heating and pressurizing in a molding process is also referred to as "resin flow"). Therefore, the resulting FRP has poor appearance such as a non-impregnated part (insufficient resin) of a resin composition or fiber meandering, and poor performance caused thereby. Malfunction or the like of a molding die may occur due to flow of a resin into an ejector pin, an air valve, or the like in a mold.

Patent Literature 2 describes a method of using an epoxy resin having a high viscosity or adding a thermoplastic resin to an epoxy resin as a method for suppressing resin flow. However, when an epoxy resin having a high viscosity is used, the resin viscosity is high at normal temperature (25° C.). Therefore, the handleability of a prepreg is significantly low, for example, laminating work is difficult.

Patent Literatures 3 to 5 describe a prepreg for high-cycle press molding, having a handleability of a prepreg at normal temperature improved and having resin flow suppressed without reducing Tg or a curing rate. In a resin used for the prepreg described in Patent Literatures 3 to 5, a thermoplastic resin is dissolved in a liquid epoxy resin to increase the resin viscosity. However, the resin viscosity during production of a prepreg is also increased. Therefore, an impregnation property of a resin into a reinforced fiber material layer is reduced, and a void may be generated in an FRP after molding.

When a resin composition in related art is used, it takes a long time for impregnating a reinforced fiber material layer with the resin composition. In addition, it takes a long time for molding a prepreg. Therefore, it is difficult to perform high-cycle press molding.

A method for controlling the viscosity of an epoxy resin in a molding temperature region most suitable for high-cycle press molding has not been found yet. Therefore, a prepreg for high-cycle press molding, using an epoxy resin and having sufficient performance, has not existed yet. Therefore, development of a prepreg using an epoxy resin and applicable to high-cycle press molding has been desired.

CITATION LIST

Patent Literature

Patent Literature 1: WO 2004/48435 A
Patent Literature 2: JP 2005-213352 A
Patent Literature 3: JP 2009-292976 A
Patent Literature 4: JP 2009-292977 A
Patent Literature 5: JP 2010-248379 A

SUMMARY OF INVENTION

Technical Problem

During molding of an FRP, a resin composition having a viscosity decreased by heating is pressurized, and the resin composition thereby flows vigorously in a prepreg or on a surface thereof. Therefore, the resin composition flows out from the prepreg to form a non-impregnated part (insufficient resin) of the resin composition in the resulting FRP or on a surface thereof. In addition, array of a reinforced fiber material is disordered due to the flow of the resin composition. As a result, the resulting FRP has appearance and physical properties reduced. In addition, the viscosity of the resin composition varies largely by a slight difference in the temperature or the pressure during impregnation of a resin into a reinforced fiber material layer or molding of the prepreg. As a result, variation may easily occur in performance of the resulting FRP.

An object of the present invention is to provide a resin composition with which a reinforced fiber material layer can be impregnated sufficiently, has a high handleability of a prepreg at normal temperature, and suppresses resin flow during molding. That is, the object of the present invention is to provide a resin composition which can suppress resin flow during molding while maintaining an impregnation property of a resin and the handleability of a prepreg highly. In addition, an object of the present invention is to provide a resin composition having a small change in the viscosity with respect to the temperature during impregnation of the resin or molding. Furthermore, an object of the present invention is to provide a prepreg formed by impregnating a reinforced fiber material layer with this resin composition and a method for producing an FRP using the prepreg.

Solution to Problem

The present inventor has found that the above problems can be solved by blending thickener particles swelled at a predetermined temperature to increase the viscosity in a heat-curable resin composition included in a prepreg and controlling the viscosity of the heat-curable resin composition, and has completed the present invention.

The present invention solving the above problems will be described below.

[1] A heat-curable resin composition is characterized by including:

(1) a heat-curable resin mixture containing a heat-curable resin (a) and thickener particles (b) and exhibiting a viscosity S as a viscosity (150° C.) obtained after the heat-curable resin mixture is held at a temperature of 150° C. for 30 seconds, and (2) a curing agent, in which
the heat-curable resin composition exhibits a lowest viscosity R at a temperature of 80 to 120° C., and the lowest viscosity R is from 0.1 to 10 Pa·s, and
the viscosity S and the lowest viscosity R satisfy the following formula (1)

$$5 < S/R < 200 \qquad \text{formula (1)}.$$

[2] The heat-curable resin composition according to [1], having the viscosity S of 10 to 300 Pa·s.

[3] The heat-curable resin composition according to [1], having a viscosity of 50 to 1000 Pa·s at a temperature of 50° C.

[4] The heat-curable resin composition according to [1], having a gel time of 40 to 200 seconds at a temperature of 150° C.

[5] The heat-curable resin composition according to [1], in which the heat-curable resin (a) is an epoxy resin.

[6] The heat-curable resin composition according to [1], in which the thickener particles (b) are formed of a polymer constituted by one or more polymerization units selected from the group consisting of a methacrylate compound, an acrylate compound, and a vinyl compound.

[7] A prepreg including a reinforced fiber material and the heat-curable resin composition according to [1], in which the reinforced fiber material layer is impregnated with a part or the whole of the heat-curable resin composition.

[8] The prepreg according to [7], in which the prepreg is a mat formed of short fibers having a fiber length of 5 to 100 mm.

[9] A method for producing a fiber-reinforced composite, including heating and pressurizing the prepreg according to [7] in a molding die at a temperature of 130 to 170° C. at a pressure of 0.2 to 10 MPa for 1 to 10 minutes.

[10] A method for producing a fiber-reinforced composite, including:

stacking the prepreg according to [7] outside a bag-shaped inner pressure bag to obtain a preform having the inner pressure bag therein, disposing the preform in a molding die, and heating and pressurizing the preform in the molding die at a temperature of 130 to 170° C. at a pressure of 0.2 to 2 MPa for 1 to 10 minutes.

A method for producing a fiber-reinforced composite, including:

stacking the prepreg according to [7] and a film bag in a lower molding die of a die sequentially to seal the prepreg between the molding die and the film bag;

then vacuuming a space formed by the molding die and the film bag; and pressurizing the inside of a cavity of the molding die formed by clamping the molding die with the air so as to have a pressure of 0.2 to 2 MPa, heating the prepreg to 130 to 170° C. at a temperature rising rate of 2 to 100° C./min in the molding die, and heating and pressurizing the prepreg at the temperature for 1 to 10 minutes.

Advantageous Effects of Invention

The heat-curable resin composition of the present invention increases an originally low viscosity of a resin composition using the thickener particles (b). Therefore, a prepreg produced using the heat-curable resin composition of the present invention has an excellent handleability at normal temperature.

The heat-curable resin composition of the present invention rapidly increases the resin viscosity due to heating during impregnation of the resin or molding, and has a temperature range with a small change in the viscosity with respect to the temperature. By performing molding within the temperature range with a small change in the viscosity, the quality of an FRP can be stabilized without accurately controlling temperature or pressure conditions during molding.

The prepreg produced using the heat-curable resin composition of the present invention hardly causes excessive flow of a resin during press molding. As a result, poor appearance of the resulting FRP, poor performance thereof, malfunction of a molding die, and the like are suppressed.

The prepreg of the present invention can be used particularly suitably for high-cycle press molding. Therefore, the method for producing an FRP of the present invention using the prepreg of the present invention has high productivity.

DESCRIPTION OF EMBODIMENTS

A heat-curable resin composition [A] of the present invention includes a heat-curable resin mixture and a curing agent. The heat-curable resin mixture includes a heat-curable resin (a) and thickener particles (b). The heat-curable resin composition [A] of the present invention increases the viscosity of the heat-curable resin composition [A] due to swelling of the thickener particles (b) at a predetermined temperature.

(1) Heat-Curable Resin Composition [A]

The heat-curable resin composition [A] of the present invention includes a heat-curable resin mixture and a curing agent. The heat-curable resin composition [A] exhibits a lowest viscosity R at a temperature of 80 to 120° C. The lowest viscosity R is from 0.1 to 10 Pa·s. The heat-curable resin mixture included in the heat-curable resin composition [A] includes the heat-curable resin (a) and the thickener particles (b), and exhibits a viscosity S as a viscosity (150° C.) obtained after the heat-curable resin mixture is held at 150° C. for 30 seconds. The heat-curable resin mixture includes no curing agent. The heat-curable resin composition [A] of the present invention is characterized in that the viscosity S and the lowest viscosity R satisfy the following formula (1)

$$5 < S/R < 200 \qquad \text{formula (1)}.$$

Unless otherwise specified, the viscosity here means a viscosity obtained after a substance is held at a measurement temperature for 30 seconds.

When S/R is less than 5, the viscosity of a resin composition with which a prepreg is impregnated is not stabilized, and the resin composition flows rapidly during molding. This causes poor appearance such as insufficient resin or fiber meandering and poor performance in a resulting FRP. When S/R is more than 200, the viscosity of a resin composition with which a prepreg is impregnated is too high during molding, a defect such as a void is generated in a resulting FRP, and poor performance occurs easily.

The viscosity S is preferably from 10 to 300 Pa·s, more preferably from 15 to 250 Pa·s, and particularly preferably from 15 to 150 Pa·s at 150° C. When the viscosity S is less than 10 Pa·s, the resin composition flows rapidly during molding. This causes poor appearance such as insufficient resin or fiber meandering and poor performance in a resulting FRP. When the viscosity S is more than 300 Pa·s, impregnation of a resin composition into a reinforced fiber material layer tends to be insufficient.

The heat-curable resin composition [A] of the present invention decreases the viscosity with rise in the temperature, and has the lowest viscosity R at 80 to 120° C. After the viscosity reaches the lowest viscosity R, the temperature is further raised. The viscosity is thereby increased rapidly due to swelling of the thickener particles (b) at 90 to 130° C. The heat-curable resin composition [A] includes a curing agent, and therefore increases the viscosity due to a curing reaction between the heat-curable resin (a) and the curing agent. That is, the heat-curable resin composition [A] increases the viscosity due to swelling of the thickener particles (b) and due to the curing reaction between the heat-curable resin (a) and the curing agent. Meanwhile, the heat-curable resin mixture included in the heat-curable resin composition [A] includes no curing agent, and therefore increases the viscosity only due to swelling of the thickener particles (b). The viscosity S obtained after the heat-curable resin mixture is held at 150° C. for 30 seconds is 5 to 200 times the lowest viscosity R of the heat-curable resin composition [A].

Before the viscosity is increased due to a curing reaction between the heat-curable resin (a) and a curing agent, the viscosity is increased rapidly due to swelling of the thickener particles (b). Therefore, the heat-curable resin composition [A] of the present invention has a temperature range with a gradual change in the viscosity. That is, the heat-curable resin composition [A] of the present invention has a temperature range with a rapid change in the viscosity and a temperature range with a gradual change in the viscosity due to heating.

Figure 1:
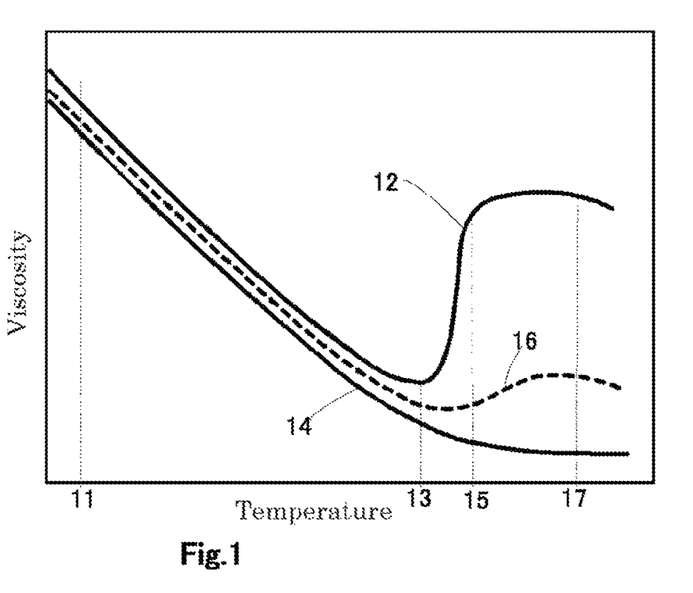
FIG. 1 exemplifies a viscosity curve of the heat-curable resin (a) and a viscosity curve of a heat-curable resin mixture.

FIG. 1 exemplifies a viscosity curve of the heat-curable resin (a) and a viscosity curve of a heat-curable resin mixture. In FIG. 1, the sign 12 indicates a viscosity curve of the heat-curable resin mixture. Unless otherwise specified, the viscosity curve here means a temperature-viscosity curve when the temperature is raised at 2° C./min. In FIG. 1, within a temperature range from the sign 11 to the sign 13, the viscosity of the heat-curable resin mixture is decreased with rise in the temperature. The heat-curable resin mixture has a lowest viscosity at the sign 13, and then increases the viscosity rapidly within a temperature range of the sign 13 to the sign 15. This rapid increase in the viscosity is caused by swelling of the thickener particles (b) in the heat-curable resin mixture. Within a temperature range of the sign 15 to the sign 17, the viscosity of the heat-curable resin mixture is approximately constant or is increased gradually. In this temperature range, a thickening effect due to swelling of the thickener particles (b) in the heat-curable resin mixture reaches saturation.

In FIG. 1, the sign 14 indicates a viscosity curve of the heat-curable resin (a). The heat-curable resin (a) decreases the viscosity with rise in the temperature within all the temperature ranges. In FIG. 1, the sign 16 is a viscosity curve indicating a change in the viscosity of a conventionally known mixture including the heat-curable resin (a) and other thermoplastic resin particles (not the thickener particles (b) in the present invention). Within the temperature range of the sign 15 to the sign 17, thickening occurs due to dissolution of the other thermoplastic resin particles, but increase in the viscosity is small.

Figure 2:
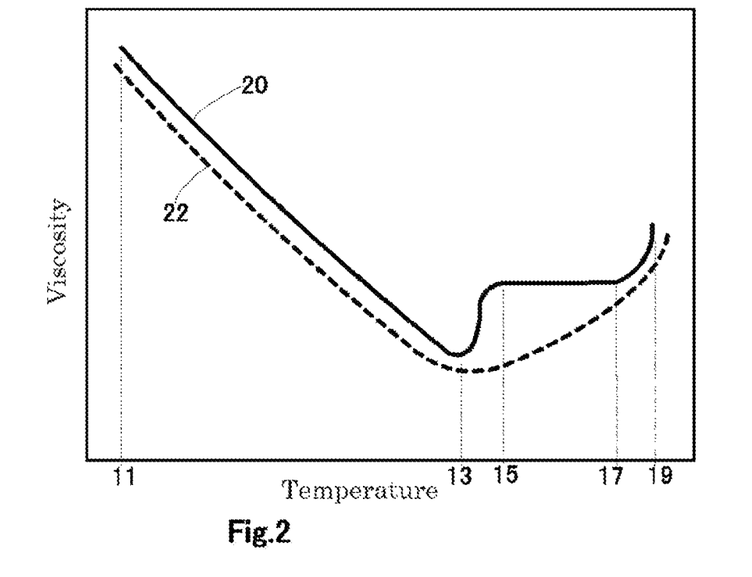
FIG. 2 exemplifies a viscosity curve of the heat-curable resin composition [A] of the present invention.

FIG. 2 exemplifies a viscosity curve of the heat-curable resin composition [A] of the present invention. In FIG. 2, the sign 20 indicates a viscosity curve of the heat-curable resin composition [A]. In FIG. 2, within a temperature range from the sign 11 to the sign 13, the viscosity of the heat-curable resin composition [A] is decreased with rise in the temperature. The heat-curable resin composition [A] has a lowest viscosity at the sign 13, and then increases the viscosity rapidly within a temperature range of the sign 13 to the sign 15. This increase in the viscosity is mainly caused by swelling of the thickener particles (b) in the heat-curable resin composition [A]. Within a temperature range of the sign 15 to the sign 17, the viscosity of the heat-curable resin composition [A] is approximately constant or is increased gradually. Within this temperature range, a thickening effect due to swelling of the thickener particles (b) in the heat-curable resin composition [A] reaches saturation. Within a temperature range of the sign 17 to the sign 19, the viscosity is increased due to a curing reaction between the heat-curable resin (a) and the curing agent in the heat-curable resin composition [A].

In FIG. 2, the sign 22 is a viscosity curve indicating a change in the viscosity of a resin composition including a heat-curable resin and a curing agent but including no thickener particles (b), that is, a resin composition in related art. Within a temperature range of the sign 13 to the sign 17, the viscosity is increased due to a curing reaction between the heat-curable resin and the curing agent. Similar thickening occurs also in the heat-curable resin composition [A] of the present invention. However, in the heat-curable resin composition [A], thickening due to swelling of the thickener particles (b) is dominant. Therefore, thickening due to the curing reaction between the heat-curable resin (a) and the curing agent is not apparent within the temperature range of the sign 13 to the sign 17.

The heat-curable resin composition [A] of the present invention has a temperature range with an approximately constant viscosity (the sign 15 to the sign 17). The viscosity within this temperature range is suitable for molding a prepreg produced using the heat-curable resin composition

[A]. The heat-curable resin composition [A] has a viscosity suitable for molding in a wide temperature range. The prepreg produced using the heat-curable resin composition [A] of the present invention can produce an FRP having a stable quality without accurately controlling temperature or pressure conditions during molding.

In the heat-curable resin composition [A] of the present invention, the viscosity is preferably from 50 to 1000 Pa·s, more preferably from 70 to 700 Pa·s, and particularly preferably from 80 to 500 Pa·s at 50° C. When a prepreg is produced using a resin composition having a viscosity of less than 50 Pa·s, the handleability of the prepreg is reduced due to tackiness of the resin composition. When the viscosity is more than 1000 Pa·s, impregnation of a resin composition into a reinforced fiber material layer tends to be insufficient.

In the heat-curable resin composition [A], the gel time is preferably from 40 to 200 seconds, and preferably from 40 to 150 seconds at 150° C. from a viewpoint of high-cycle molding.

In order to make impregnation into a reinforced fiber material layer easy, the heat-curable resin composition [A] needs to have a temperature range within which the heat-curable resin composition [A] has a lowest viscosity. In the heat-curable resin composition [A], the lowest viscosity R is from 0.1 to 10 Pa·s, and is preferably from 0.5 to 8 Pa·s. The temperature exhibiting the lowest viscosity depends on a composition of the heat-curable resin composition [A], but is a viscosity when the heat-curable resin composition [A] is at 80 to 120° C.

The heat-curable resin composition [A] of the present invention has an excellent flow suppressing ability of a resin during molding as an advantage of using a heat-curable resin composition having a high viscosity, and an excellent impregnation property of a resin and an excellent handleability of a prepreg as advantages of using a heat-curable resin composition having a low viscosity.

(1-1) Heat-Curable Resin Mixture

The heat-curable resin mixture includes the heat-curable resin (a) and the thickener particles (b), but includes no curing agent.

(1-1-1) Heat-Curable Resin (a)

Examples of the heat-curable resin (a) in the present invention include an epoxy resin, an unsaturated polyester resin, a vinyl ester resin, a phenol resin, a melamine resin, a polyurethane resin, a silicon resin, a maleimide resin, a cyanate resin, and a resin obtained by prepolymerizing a maleimide resin and a cyanate resin. In the present invention, a mixture of these resins can be used. Particularly, an epoxy resin having excellent heat resistance, elastic modulus, and chemical resistance is preferable.

Examples of the epoxy resin include a bifunctional epoxy resin such as a bisphenol epoxy resin, an alcohol epoxy resin, a biphenyl epoxy resin, a hydrophthalic acid epoxy resin, a dimer acid epoxy resin, or an alicyclic epoxy resin; a glycidyl ether epoxy resin such as tetrakis (glycidyloxyphenyl) ethane or tris (glycidyloxyphenyl) methane; a glycidyl amine epoxy resin such as tetraglycidyl diamino diphenylmethane; a naphthalene epoxy resin; a phenol novolac epoxy resin which is a novolac epoxy resin; and a cresol novolac epoxy resin.

In addition, examples thereof include a polyfunctional epoxy resin such as a phenol epoxy resin. In addition, various modified epoxy resins such as a urethane-modified epoxy resin and a rubber-modified epoxy resin can be used.

Particularly, an epoxy resin having an aromatic group in a molecule thereof is preferable, and an epoxy resin having a glycidyl amine structure or a glycidyl ether structure is more preferable. An alicyclic epoxy resin can be also used suitably.

Examples of the epoxy resin having a glycidyl amine structure include various isomers of N,N,N',N'-tetraglycidyl diamino diphenylmethane, N,N,O-triglycidyl-p-aminophenol, N,N,O-triglycidyl-m-aminophenol, N,N,O-triglycidyl-3-methyl-4-aminophenol, and triglycidyl amino cresol.

Examples of the epoxy resin having a glycidyl ether structure include a bisphenol A epoxy resin, a bisphenol F epoxy resin, a bisphenol S epoxy resin, a phenol novolac epoxy resin, and a cresol novolac epoxy resin.

These epoxy resins may have a non-reactive substituent in an aromatic ring structure or the like, if necessary. Examples of the non-reactive substituent include an alkyl group such as methyl, ethyl, or isopropyl; an aromatic group such as phenyl; an alkoxyl group, an aralkyl group, and a halogen group such as chlorine or bromine.

Examples of the bisphenol epoxy resin include a bisphenol A resin, a bisphenol F resin, a bisphenol AD resin, and a bisphenol S resin. Specific examples thereof include jER815 (trade name), jER828 (trade name), jER834 (trade name), jER1001 (trade name), and jER807 (trade name) manufactured by Mitsubishi Chemical Co., Ltd.; Epomik R-710 (trade name) manufactured by Mitsui Petrochemical Industries, and EXA1514 (trade name) manufactured by Dainippon Ink and Chemicals.

Examples of the alicyclic epoxy resin include Araldite CY-179 (product name), CY-178 (product name), CY-182 (product name), and CY-183 (trade name), manufactured by Huntsman Corporation.

Examples of the phenol novolac epoxy resin include jER152 (trade name) and jER154 (trade name) manufactured by Mitsubishi Chemical Co., Ltd.; DEN431 (trade name), DEN485 (trade name), and DEN438 (trade name) manufactured by Dow Chemical Company, and Epiclon N740 (trade name) manufactured by DIC Corporation. Examples of the cresol novolac epoxy resin include Araldite ECN1235 (trade name), ECN1273 (trade name), and ECN1280 (trade name) manufactured by Huntsman Corporation; EOCN102 (trade name), EOCN103 (trade name), and EOCN104 (trade name) manufactured by Nippon Kayaku Co.; Epotohto YDCN-700-10 (trade name) and Epotohto YDCN-704 (trade name) manufactured by Nippon Steel and Sumitomo Chemical Co. Ltd.; and Epiclon N680 (trade name) and Epiclon N695 (trade name) manufactured by DIC Corporation.

As the various modified epoxy resins, examples of the urethane-modified bisphenol A epoxy resin include Adeka Resin EPU-6 (trade name) and EPU-4 (trade name) manufactured by Adeka Corporation.

By selecting these epoxy resins appropriately, one kind thereof or a mixture of two or more kinds thereof can be used. Among these epoxy resins, a bifunctional epoxy resin represented by a bisphenol resin includes various grades of resins from liquid to solid depending on a difference in a molecular weight. Therefore, these resins are preferably blended in order to adjust the viscosity of a resin composition.

(1-1-2) Thickener Particles (b)

The thickener particles in the present invention mean particles thickened when the particles are mixed with the heat-curable resin composition [A] and heat is applied to the mixture, and resin particles which make the viscosity (viscosity obtained after the mixture is held at 150° C. for 30 seconds) of a resin composition 10% by mass of which has been mixed with the heat-curable resin composition [A] 10 times or more, preferably 50 times or more the viscosity of the heat-curable resin composition [A] at 150° C.

Examples of the thickener particles (b) used in the present invention include particles obtained by copolymerizing one or more unsaturated compounds and crosslinkable monomers. The thickener particles (b) are not particularly limited, but preferably include a resin formed by at least one monomer unit of an acrylate compound, a methacrylate compound, and a vinyl compound.

The acrylate compound used for the thickener particles (b) means a compound having an acrylate structure and a derivative thereof. Examples thereof include methyl acrylate, ethyl acrylate, n-propyl acrylate, isopropyl acrylate, n-butyl acrylate, isobutyl acrylate, sec-butyl acrylate, t-butyl acrylate, n-hexyl acrylate, and cyclohexyl acrylate.

The methacrylate compound used for the thickener particles (b) means a compound having an methacrylate structure and a derivative thereof. Examples thereof include methyl methacrylate, ethyl methacrylate, n-propyl methacrylate, isopropyl methacrylate, n-butyl methacrylate, n-hexyl methacrylate, and cyclohexyl methacrylate.

The vinyl compound used for the thickener particles (b) means a compound having a polymerizable vinyl structure. Examples thereof include styrene, α-methyl styrene, divinyl benzene, and a compound obtained by replacing a hydrogen atom of an aromatic ring thereof with various functional groups such as an alkyl group and a halogen atom.

The thickener particles (b) may be a polymer constituted by one or more polymerization units of a methacrylate compound, an acrylate compound, and a vinyl compound, or may be a resin obtained by mixing two or more resins having different structures.

In addition, the thickener particles (b) may be a composite resin ion-crosslinked by adding (iii) a metal ion to (i) a polymer including at least one of an acrylate compound, a methacrylate compound, and a diene compound and (ii) a polymer including an acrylate compound or a methacrylate compound, and a radically-polymerizable unsaturated carboxylic acid.

As the thickening particles (b), a commercially available product formed of an alkyl methacrylate polymer having no core-shell structure, such as Zefiac F325 or Zefiac F320 (manufactured by Aika Kogyo Co., Ltd.) is preferably used. An alkyl methacrylate polymer having a core-shell structure is not preferable because of being hardly swelled in a heat-curable resin composition due to a shell structure and a low effect of increasing the viscosity.

The particle diameter or the like of each of the thickener particles (b) is not particularly limited. However, the average particle diameter is preferably from 0.3 to 10 µm, and more preferably from 0.5 to 8 µm. The thickener particles (b) are swelled so as to have a particle diameter of 1 to 50 µm by heating. The content of the thickener particles (b) is preferably from 5 to 40 parts by mass, more preferably from 6 to 30 parts by mass, and particularly preferably from 8 to 20 parts by mass with respect to 100 parts by mass of the heat-curable resin (a).

The thickener particles (b) dispersed in the heat-curable resin composition [A] are swelled in the heat-curable resin composition [A] by heating. Swelling of the thickener particles (b) proceeds with the temperature and time. The viscosity of the heat-curable resin composition [A] is increased rapidly with swelling of the thickener particles (b).

The heat-curable resin composition [A] has a low viscosity before the thickener particles (b) are swelled therein, and therefore has an excellent impregnation property into a reinforced fiber material layer. By increase in the viscosity of the heat-curable resin composition [A] in the reinforced fiber material layer due to swelling of the thickener particles (b), resin flow during molding is suppressed. By performing molding after the thickener particles (b) are sufficiently swelled by holding a prepreg at a temperature at which the thickener particles (b) are swelled (120 to 170° C. in the heat-curable resin composition [A] of the present invention) for 10 to 90 seconds, both a resin impregnation property and suppression of resin flow can be obtained at a high level.

(1-2) Curing Agent

Examples of the curing agent used in the present invention include various isomers of dicyandiamide, an aromatic amine curing agent, and a urea curing agent, and an imidazole compound. An amide curing agent dicyandiamide (DICY) or an imidazole compound is preferable from a viewpoint of excellent curability and physical properties after curing.

Specific examples of dicyandiamide (DICY) include jER Cure DICY7 and DICY15 manufactured by Mitsubishi Chemical Co., Ltd.

When DICY is used, a urea curing agent is preferably used together therewith. DICY does not have a very large solubility in an epoxy resin, and therefore needs to be heated to a high temperature of 160° C. or higher in order to be dissolved therein sufficiently. However, the dissolution temperature can be lowered by a combination use with a urea curing agent.

Examples of the urea curing agent include phenyl dimethyl urea (PDMU) and toluene bis-dimethyl urea (TBDMU).

The blending amount of a curing agent in the heat-curable resin composition [A] is from 5 to 30 parts by mass with respect to 100 parts by mass of the heat-curable resin (a). By the blending amount of the curing agent of 5 parts by mass or more, a sufficient crosslinking density and a sufficient curing rate are obtained. By the blending amount of the curing agent of 30 parts by mass or less, a disadvantage such as reduction in mechanical properties of a cured resin due to an excess amount of the curing agent or turbidity of the cured resin can be suppressed.

When DICY and a urea curing agent (PDMU, TBDMU, or the like) are used together, the blending amount of DICY is preferably from 4 to 15 parts by mass, and the blending amount of the urea curing agent is preferably from 3 to 10 parts by mass (the total amount of DICY and the urea curing agent is from 7 to 20 parts by mass) with respect to 100 parts by mass of the epoxy resin (a).

Examples of the imidazole compound include an imidazole compound obtained by replacing the 5-position hydrogen of 1H-imidazole with a hydroxymethyl group and replacing the 2-position hydrogen with a phenyl group or a toluyl group. Examples of such an imidazole compound include 2-phenyl-4,5-dihydroxymethyl imidazole, 2-phenyl-4-methyl-5-hydroxymethyl imidazole, 2-phenyl-4-benzyl-5-hydroxymethyl-imidazole, 2-p-tolyl-4-methyl-5-hydroxymethyl imidazole, 2-m-tolyl-4-methyl-5-hydroxymethyl imidazole, 2-m-tolyl-4,5-dihydroxymethyl imidazole, and 2-p-tolyl-4,5-dihydroxymethyl imidazole. Among these imidazole compounds, 2-phenyl-4,5-dihydroxymethyl imidazole, 2-phenyl-4-methyl-5-hydroxymethyl imidazole, 2-p-tolyl-4-methyl-5-hydroxymethyl imidazole, 2-m-tolyl-4-methyl-5-hydroxymethyl imidazole, 2-m-tolyl-4,5-dihydroxymethyl imidazole, and 2-p-tolyl-4,5-dihydroxymethyl imidazole are more preferable.

Examples of the imidazole compound include 1-(2-hydroxy-3-phenoxypropyl)-2-methylimidazole and an adduct compound obtained by a reaction between a glycidyl ether heat-curable resin and 2-methyl imidazole. Particularly, an adduct compound obtained by a reaction between an aryl glycidyl ether heat-curable resin and 2-methyl imidazole is preferable because the adduct compound can make physical properties of a cured heat-curable resin composition excellent. When an imidazole compound is used as a curing agent, the content of the imidazole compound is preferably from 2 to 30 parts by mass, and preferably from 3 to 15 parts by mass with respect to 100 parts by mass of the heat-curable resin (a).

(1-3) Other Additives

A flame retardant, an inorganic filler, and an internal releasing agent may be blended to the heat-curable resin composition [A] of the present invention.

Examples of the flame retardant include a phosphorus flame retardant. The phosphorus flame retardant is not particularly limited as long as the phosphorus flame retardant contains a phosphorus atom in a molecule thereof. Examples thereof include an organic phosphorus compound such as a phosphate, a condensed phosphate, a phosphazene compound, or a polyphosphate, and red phosphorus.

The phosphate means an ester compound of phosphoric acid and an alcohol compound, or an ester compound of phosphoric acid and a phenol compound. In the present invention, flame retardancy can be imparted to a fiber-reinforced composite by blending a phosphate thereto.

Specific examples of the phosphate include trimethyl phosphate, triethyl phosphate, tributyl phosphate, tri(2-ethylhexyl) phosphate, tributoxyethyl phosphate, triphenyl phosphate, tricresyl phosphate, trixylenyl phosphate, tris (isopropylphenyl) phosphate, tris (phenylphenyl) phosphate, trinaphthyl phosphate, cresyl diphenyl phosphate, xylenyl diphenyl phosphate, diphenyl (2-ethylhexyl) phosphate, di(isopropylphenyl) phenyl phosphate, mono-isodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, di-melamine phosphate, melamine pyrophosphate, triphenyl phosphine oxide, tricresyl phosphine oxide, methanephosphonic acid diphenyl, phenylphosphonic acid diethyl, resorcinol polyphenyl phosphate, resorcinolpoly(di-2,6-xylyl) phosphate, bisphenol A polycresyl phosphate, hydroquinone poly(2,6-xylyl) phosphate, and condensates thereof.

Examples of the condensed phosphate include resorcinol bis(di-2,6-xylyl) phosphate, resorcinol bis(diphenyl phosphate), and bisphenol A bis (diphenyl phosphate). Examples of a commercially available product of resorcinol bis(di-2, 6-xylyl) phosphate include PX-200 (manufactured by Daihachi Chemical Industry Co., Ltd.). Examples of a commercially available product of resorcinol bis(diphenyl phosphate) include CR-733S (manufactured by Daihachi Chemical Industry Co.). Examples of a commercially available product of bisphenol A bis(diphenyl phosphate) include CR-741 (manufactured by Daihachi Chemical Industry Co., Ltd.). Particularly, resorcinol bis(di-2,6-xylyl) phosphate is preferably used from a viewpoint of excellent curability and heat resistance.

A phosphazene compound can impart flame retardancy to an FRP because the phosphazene compound contains a phosphorus atom and a nitrogen atom in a molecule thereof. The phosphazene compound is not particularly limited as long as the phosphazene compound contains no halogen atom but has a phosphazene structure in a molecule thereof. Examples of a commercially available product of a phosphazene compound include SPR-100, SA-100, SPB-100, SPB-100L (manufactured by Otsuka Chemical Co., Ltd.), and FP-100 and FP-110 (manufactured by Fushimi Co., Ltd.).

A flame retardant effect of a phosphorus atom is considered to be due to an effect for promoting formation of a carbide, exhibited by the phosphorus atom, and is influenced by the content of the phosphorus atom in the heat-curable resin composition. In the present invention, the content of a phosphorus atom in the heat-curable resin composition [A] is preferably from 1.2 to 4.0% by mass, and more preferably from 1.4 to 4.0% by mass. When the content of a phosphorus atom is less than 1.2% by mass, a sufficient flame retardant effect is not necessarily obtained. When the content of a phosphorus atom is more than 4.0% by mass, heat resistance of an FRP may be reduced, or a mechanical characteristic, particularly rigidity or a Charpy impact value may be reduced. Here, the content of phosphorus (% by mass) is determined by a formula of the mass of a phosphorus atom (g)/the mass of the heat-curable resin composition [A] (g)×100. The content of a phosphorus atom in the heat-curable resin composition [A] can be determined by the above calculation method. In addition, the content of a phosphorus atom can be determined by organic elemental analysis of the heat-curable resin composition [A] or an FRP or inductively coupled plasma mass spectrometry (ICP-MS) thereof.

Among the above phosphorus flame retardants, a phosphate and a phosphazene compound are preferably used because of capability of obtaining a cured resin having an excellent handleability and a transparent color.

Examples of the inorganic filler include aluminum borate, calcium carbonate, silicon carbonate, silicon nitride, potassium titanate, basic magnesium sulfate, zinc oxide, graphite, calcium sulfate, magnesium borate, magnesium oxide, and a silicate mineral. Particularly, a silicate mineral is preferably used. Examples of a commercially available product of a silicate mineral include THIXOTROPIC AGENT DT 5039 (manufactured by Huntsman Japan K.K.). By adding a silicate mineral to the heat-curable resin composition [A] of the present invention, outflow of the heat-curable resin composition [A] from a prepreg is further suppressed, and a high-quality FRP is obtained during molding.

Examples of the internal releasing agent include a metal soap, a plant wax such as a polyethylene wax or a carnauba wax, a fatty acid ester releasing agent, a silicone oil, an animal wax, and a nonionic fluorine surfactant. The blending amount of the internal releasing agent is preferably from 0.1 to 5 parts by mass, and more preferably from 0.2 to 2 parts by mass with respect to 100 parts by mass of the heat-curable resin. A releasing effect from a molding die is suitably exhibited within this range.

Examples of a commercially available product of the internal releasing agent include "MOLD WIZ (registered trademark)", INT1846 (manufactured by AXEL PLASTICS RESEARCH LABORATORIES INC.), Licowax S, Licowax P, Licowax OP, Licowax PE190, and Licowax PED (manufactured by Clariant Japan K.K.), and stearyl stearate (SL-900A manufactured by Riken Vitamin Co., Ltd.)

(1-4) Method for Producing Heat-Curable Resin Composition [A]

The heat-curable resin composition [A] can be produced by mixing the heat-curable resin (a), the thickener particles (b), and a curing agent. The order of mixing these components does not matter. That is, the heat-curable resin composition [A] may be produced by producing a heat-curable resin mixture obtained by mixing the heat-curable resin (a) and the thickener particles (b) and then mixing a curing agent with this heat-curable resin mixture, or may be produced by mixing the heat-curable resin (a), the thickener particles (b), and a curing agent at the same time.

A method for producing the heat-curable resin composition [A] is not particularly limited, but any conventionally known method may be used. Examples of the mixing temperature include a range of 40 to 120° C. When the temperature is higher than 120° C., an impregnation property into a reinforced fiber material layer may be reduced due to partial progress of a curing reaction, or storage stability of a resulting resin composition or a prepreg produced using the resin composition may be reduced. When the temperature is lower than 40° C., mixing may be substantially difficult due to a high viscosity of the resin composition. The mixing temperature is preferably from 50 to 100° C., and more preferably from 50 to 90° C.

A conventionally known mixing machine device can be used. Specific examples thereof include a roll mill, a planetary mixer, a kneader, an extruder, a Banbury mixer, a mixing vessel equipped with a stirring blade, and a horizontal mixing tank. Components can be mixed in the atmosphere or an inert gas atmosphere. When mixing is performed in the atmosphere, an atmosphere in which the temperature and the humidity are controlled is preferable. The atmosphere is not particularly limited. However, mixing is preferably performed in an atmosphere in which the temperature is controlled so as to be a constant temperature of 30° C. or lower, or the humidity is so low as to have a relative humidity of 50% RH or less.

(2) Prepreg

The prepreg of the present invention includes a reinforced fiber material and the heat-curable resin composition [A]. A reinforced fiber material layer is impregnated with a part or the whole of the heat-curable resin composition [A], and the heat-curable resin composition [A] is integrated with the reinforced fiber material.

The shape of the prepreg of the present invention may be a prepreg sheet having reinforced fibers formed into a sheet shape, or a strand prepreg having reinforced fibers formed into a strand shape.

The prepreg of the present invention uses a resin composition originally having a low viscosity. Therefore, the reinforced fiber material layer is easily impregnated with the resin. During heating and molding, the viscosity of the resin composition is increased using the thickener particles (b) within a predetermined temperature range. Therefore, the heat-curable resin composition [A] has a temperature range having a gradual change in the viscosity, and can suppress resin flow from the prepreg due to molding within the temperature range. As a result, an FRP produced using the prepreg of the present invention hardly causes molding failure such as insufficient resin. Meanwhile, a method for increasing the viscosity of a resin composition itself by appropriately selecting a heat-curable resin to be used or the like, or a method in related art for increasing the viscosity of a resin composition by dissolving a thermoplastic resin in the resin composition increases the viscosity of the resin composition as a whole. In this case, resin flow can be suppressed, but an impregnation property of a resin composition into a reinforced fiber material layer is reduced. As a result, a prepreg produced using a resin composition in related art, the viscosity of which has been increased in this way, has many non-impregnated parts of a resin, and many voids are formed in an FRP produced using the prepreg.

The content (RC) of the heat-curable resin composition [A] is preferably from 15 to 60% by mass, more preferably from 20 to 50% by mass, and particularly preferably from 25 to 45% based on the total mass of the prepreg. When the content is less than 15% by mass, a void or the like may be generated in a resulting FRP to deteriorate a mechanical characteristic or the like. When the content is more than 60% by mass, reinforced fibers may exhibit an insufficient reinforcing effect to deteriorate a mechanical characteristic or the like of a resulting FRP.

The content (RC) of the heat-curable resin composition is determined by immersing a prepreg in sulfuric acid and eluting a resin composition with which the prepreg is impregnated. Specifically, the content (RC) is determined by the following method.

First, a test piece is produced by cutting out a prepreg into a size of 100 mm×100 mm, and the mass thereof is measured. Subsequently, the test piece of the prepreg is immersed in sulfuric acid, and is boiled, if necessary. A resin composition with which the prepreg is impregnated is thereby decomposed, and is eluted into sulfuric acid. Thereafter, the remaining fibers are filtered and washed with sulfuric acid, and then are dried to measure the mass of the fibers. The content of the resin composition is calculated from a change in the mass before and after the decomposition operation with sulfuric acid.

A form of the prepreg of the present invention preferably includes a reinforcing layer including a reinforced fiber material and the heat-curable resin composition [A] with which the reinforced fiber material layer is impregnated, and a resin coating layer coated on a surface of the reinforcing layer. The thickness of the resin coating layer is preferably from 2 to 50 µm. When the thickness of the resin coating layer is less than 2 µm, tackiness may be insufficient to significantly reduce moldability of the prepreg. When the thickness of the resin coating layer is more than 50 µm, it may be difficult to wind the prepreg into a roll with a uniform thickness to significantly reduce molding accuracy. The thickness of the resin coating layer is preferably from 5 to 45 µm, and particularly preferably from 10 to 40 µm.

(2-1) Reinforced Fiber Material

Examples of the reinforced fiber material include a base material formed of a carbon fiber, a glass fiber, an aramid fiber, a silicon carbide fiber, a polyester fiber, a ceramic fiber, an alumina fiber, a boron fiber, a metal fiber, a mineral fiber, a rock fiber, and a slug fiber. Among these reinforced fibers, a carbon fiber, a glass fiber, and an aramid fiber are preferable. A carbon fiber is more preferable due to capability of obtaining an FRP having excellent specific strength and specific elastic modulus, light weight, and high strength. A polyacrylonitrile (PAN) carbon fiber is particularly preferable in terms of excellent tensile strength.

When a PAN carbon fiber is used for a reinforced fiber, the tensile elastic modulus thereof is preferably from 100 to 600 GPa, more preferably from 200 to 500 GPa, and particularly preferably from 230 to 450 GPa. The tensile strength is from 2000 to 10000 MPa, and preferably from 3000 to 8000 MPa. The diameter of the carbon fiber is preferably from 4 to 20 µm, and more preferably from 5 to 10 µm. By use of such a carbon fiber, a mechanical characteristic of a resulting FRP can be improved.

The reinforced fiber material is preferably formed into a sheet shape to be used. Examples of the reinforced fiber material sheet include a sheet obtained by drawing and arranging a large number of reinforced fibers in one direction, a bidirectional woven fabric such as a plain weave or a twill weave, a multi-axial woven fabric, a non-woven fabric, a mat, a knit, a braid, and paper made of reinforced fibers.

The thickness of the sheet-shaped reinforced fiber material is preferably from 0.01 to 3 mm, and more preferably from 0.1 to 1.5 mm. These reinforced fiber materials may contain a well-known sizing agent in a well-known content.

As the prepreg of the present invention, a strand prepreg in which a reinforced fiber is formed into a strand shape can be used. The strand prepreg is produced by fiber-separation of a sheet-shaped unidirectional prepreg. The width of the strand prepreg is preferably from 3 to 20 mm, and more preferably from 6 to 10 mm. A short fiber prepreg is preferably produced by cutting the strand prepreg in a length direction. The fiber length is preferably from 5 to 100 mm, and more preferably from 10 to 50 mm. The cut short fiber prepreg is preferably formed into a mat shape to produce a prepreg mat.

(2-2) Method for Producing Prepreg

A method for producing the prepreg of the present invention is not particularly limited, but any conventionally known method can be used. Specifically, a hot-melt method or a solvent method can be used suitably.

The hot-melt method is such a method as follows. That is, a resin composition film is formed by applying a resin composition on release paper so as to have a thin film shape, the resin composition film is laminated on a reinforced fiber material and is heated under pressure, and the reinforced fiber material layer is thereby impregnated with the resin composition.

A method for forming a resin composition film from a resin composition is not particularly limited, but any conventionally known method can be used. Specifically, a resin composition film can be obtained by casting a resin composition on a support such as release paper or a film using a die extruder, an applicator, a reverse roll coater, a comma coater, or the like. The resin temperature when the film is produced is determined appropriately according to the composition or the viscosity of the resin composition. Specifically, the same temperature conditions as the mixing temperature in the above method for producing a heat-curable resin composition are suitably used. Impregnation of the resin composition into the reinforced fiber material layer may be performed once or multiple times.

The solvent method is such a method as follows. That is, a heat-curable resin composition is formed into a varnish form using an appropriate solvent, and a reinforced fiber material layer is impregnated with the varnish.

The prepreg of the present invention can be produced suitably by the hot-melt method using no solvent among these conventional methods.

When a reinforced fiber material layer is impregnated with a heat-curable resin composition film by the hot-melt method, the impregnation temperature is preferably from 50 to 120° C. When the impregnation temperature is lower than 50° C., the heat-curable resin composition film may have a high viscosity, and the reinforced fiber material layer is not necessarily impregnated with the heat-curable resin composition film. When the impregnation temperature is higher than 120° C., storage stability of a resulting prepreg or a drape property may be reduced due to progress of a curing reaction of the heat-curable resin composition. The impregnation temperature is more preferably from 60 to 110° C., and particularly preferably from 70 to 100° C.

When a reinforced fiber material layer is impregnated with a heat-curable resin composition film by the hot-melt method, the impregnation pressure is appropriately determined considering the viscosity of the resin composition, resin flow, or the like.

(3) Fiber-Reinforced Composite (FRP)

An FRP can be obtained by curing the prepreg of the present invention by heating and pressurizing the prepreg under specific conditions. Examples of a method for producing an FRP using the prepreg of the present invention include press molding, inner pressure molding, and vacuum assist-pressure molding.

(3-1) Press Molding Method

As a method for producing an FRP of the present invention, a press molding method is preferable from a viewpoint of obtaining an FRP with high productivity and high quality by utilizing characteristics of the heat-curable resin composition [A] included in the prepreg. An FRP is produced by the press molding method by heating and pressurizing the prepreg of the present invention or a preform formed by laminating the prepreg of the present invention using a molding die. The molding die is preferably heated to a curing temperature in advance.

The temperature of the molding die during press molding is preferably from 130 to 170° C. Within this temperature range, the viscosity of the heat-curable resin composition [A] of the present invention is constant or is increased gradually. By the molding temperature of 130° C. or higher, a curing reaction can be caused sufficiently, and an FRP can be obtained with high productivity. By the molding temperature of 170° C. or lower, the resin viscosity is not too low, and excess flow of a resin in the molding die can be suppressed. As a result, outflow of a resin from the molding die or fiber meandering can be suppressed. Therefore, a high-quality FRP is obtained.

The prepreg put in the molding die is preferably held in the molding die at the above temperature for 10 to 90 seconds before being pressurized. In this way, the viscosity of the heat-curable resin composition [A] can be increased sufficiently due to sufficient swelling of the thickener particles (b) in the heat-curable resin composition [A]. The increase in the viscosity suppresses outflow of the heat-curable resin composition [A] from the prepreg. The prepreg is subjected to press molding within a temperature range having a small change in the viscosity of the heat-curable resin composition [A], and therefore a non-impregnated part is hardly generated in a resulting FRP.

The pressure during molding is from 0.2 to 10 MPa. By a pressure of 0.2 MPa or more, a moderate flow of the resin is obtained, and poor appearance or generation of a void can be prevented. In addition, the prepreg sufficiently adheres to the molding die, and therefore an FRP having excellent appearance can be produced. A pressure of 10 MPa or less does not make the resin flow excessively, and therefore poor appearance of a resulting FRP hardly occurs. In addition, an excess load is not applied to the molding die, and therefore deformation of the molding die or the like hardly occurs.

(3-2) Inner Pressure Molding Method

As a method for producing an FRP of the present invention, an inner pressure molding method is also preferably used. The inner pressure molding method is such a method as follows. That is, a prepreg is disposed outside a bag-shaped inner pressure bag to obtain a prepreg laminate having the inner pressure bag therein. This prepreg laminate is disposed in a molding die, the molding die is clamped, and the inner pressure bag is expanded in the molding die. The prepreg is thereby inscribed to the inner wall of the molding die, and is heated and cured in this state.

A method for producing an FRP by the inner pressure molding method will be described. First, the prepreg of the present invention is disposed in each of an upper molding die of a molding die and a lower molding die thereof. Subsequently, an inner pressure bag is put between the upper molding die and the lower molding die in each of which the prepreg is disposed, and the upper molding die and the lower molding die are clamped. A prepreg laminate having the inner pressure bag therein is thereby obtained. Thereafter, the prepreg in the molding die is inscribed to the inner wall of the molding die by expanding the inner pressure bag in the molding die, and the prepreg is heated and cured by heating the molding die in this state. After an elapse of a predetermined time, a molded article is taken out of the molding die, and the inner pressure bag is removed to obtain an FRP.

The molding die is preferably preheated to a curing temperature before the prepreg is disposed from a viewpoint of productivity.

A material of the inner pressure bag is preferably a material having flexibility and excellent heat resistance, such as nylon or silicone rubber.

The temperature in the molding die during inner pressure molding is preferably from 130 to 170° C. Within this temperature range, the viscosity of the heat-curable resin composition [A] of the present invention is constant or is increased gradually. By the molding temperature of 130° C. or higher, a curing reaction can be caused sufficiently, and an FRP can be obtained with high productivity. By the molding temperature of 170° C. or lower, the resin viscosity is not too low, and excess flow of a resin in the molding die can be suppressed. As a result, outflow of a resin from the molding die or fiber meandering is suppressed, and a high-quality FRP is obtained.

The pressure during molding is from 0.2 to 2 MPa. By a pressure of 0.2 MPa or more, moderate flow of the resin is obtained, and poor appearance or generation of a void can be prevented. In addition, the prepreg sufficiently adheres to the molding die, and therefore an FRP having excellent appearance can be obtained. By a pressure of 2 MPa or more, the inner pressure bag having flexibility, such as nylon or silicone rubber, is not broken easily.

(3-3) Vacuum Assist-Pressure Molding Method

As a method for producing an FRP of the present invention, a vacuum assist-pressure molding method is also preferably used. The vacuum assist-pressure molding method is such a method as follows. That is, a prepreg and a film bag are disposed sequentially in a lower molding die of a molding die, and the prepreg is sealed between the lower molding die and the film bag. A space formed by the lower molding die and the film bag is vacuumed, and the inside of a cavity of the molding die formed by clamping an upper molding die and the lower molding die is pressurized with the air, and the prepreg is heated and cured.

A method for producing an FRP by the vacuum assist-pressure molding method will be described. First, the prepreg of the present invention is disposed in a lower molding die of a molding die. Subsequently, a film bag is stacked on the prepreg, and the prepreg is sealed between the lower molding die and the film bag. Thereafter, a space formed by the lower molding die and the film bag is vacuumed, and the prepreg is thereby brought into contact with the lower molding die. Furthermore, the inside of a cavity of the molding die formed by clamping the molding die is pressurized with the air, and the prepreg is further brought into close contact with the lower molding die. The prepreg is heated and cured by being heated in this state. After an elapse of a predetermined time, a molded article is taken out of the molding die, and the inner pressure bag is removed to obtain an FRP.

The lower molding die preferably has a heating structure capable of being heated rapidly from a viewpoint of productivity.

A material of the film bag is preferably a material having flexibility and excellent heat resistance, such as nylon or silicone rubber.

Preferably, the prepreg and the film bag are stacked at the molding die temperature of 20 to 50° C. and a vacuum state is obtained, and then the molding die is heated to 130 to 170° C. at a temperature rising rate of 2 to 100° C./min. Within this temperature range, the viscosity of the heat-curable resin composition [A] of the present invention is constant or is increased gradually. By the molding temperature of 130° C. or higher, a curing reaction can be caused sufficiently, and an FRP can be obtained with high productivity. By the molding temperature of 170° C. or lower, the resin viscosity is not too low, excess flow of a resin in the molding die can be suppressed, and outflow of the resin from the molding die or fiber meandering can be suppressed. Therefore, a high-quality FRP is obtained.

The pressure during molding is from 0.2 to 2 MPa. By a pressure of 0.2 MPa or more, moderate flow of the resin is obtained, and poor appearance or generation of a void can be prevented. In addition, the prepreg sufficiently adheres to the molding die, and therefore an FRP having excellent appearance can be obtained. By a pressure of 2 MPa or less, a film bag having flexibility, such as nylon or silicone rubber, is not broken easily.

The curing time in the producing method of the present invention is from 1 to 10 minutes, shorter than that in related art. That is, a high-quality FRP can be produced with high productivity.

According to the producing method of the present invention described above, failure in a molding die during molding can be suppressed. In addition, a high quality FRP having poor appearance, poor performance, or the like suppressed can be obtained with high productivity.

EXAMPLES

Hereinbelow, the present invention will be described more specifically with Examples, but is not limited to Examples. Components and a test method used in Examples and Comparative Examples will be described below.

(Carbon fiber)

"Tenax (registered trademark)" HTS40-12K: (tensile strength: 4.2 GPa, tensile elastic modulus: 240 GPa, manufactured by Toho Tenax Co., Ltd.)

(Heat-Curable Resin)

"jER (registered trademark)" 154: (semisolid phenol novolac epoxy resin manufactured by Mitsubishi Chemical Co., Ltd.)

"jER (registered trademark)" 828: (liquid bisphenol A epoxy resin manufactured by Mitsubishi Chemical Co., Ltd.)

"jER (registered trademark)" 834: (liquid bisphenol A epoxy resin manufactured by Mitsubishi Chemical Co., Ltd.)

"jER (registered trademark)" 1001: (solid bisphenol A epoxy resin manufactured by Mitsubishi Chemical Co., Ltd.)

"Epotohto (registered trademark)" 704: (cresol novolac epoxy resin manufactured by Nippon Steel and Sumitomo Chemical Co. Ltd.)

"Neopol (registered trademark)" 8026: (liquid vinyl ester resin manufactured by Japan U-Pica Company Ltd.)

"Ripoxy (registered trademark)" V-60: (solid vinyl ester resin manufactured by Showa Denko K.K.)

(Curing Agent)

Dicy7: (dicyandiamide manufactured by Mitsubishi Chemical Co., Ltd.)

"Omicure (registered trademark)" 24: (2,4'-toluene-bis(3,3-dimethyl urea) manufactured by PTI Japan Corporation)

"Omicure (registered trademark)" 52: (4,4'-methylene bis (diphenyl dimethyl urea) manufactured by PTI Japan Corporation)

DCMU-99: (3,4-dichlorophenyl-1,1-dimethylurea manufactured by Hodogaya Chemical Co., Ltd.)

2P4MHZ-PW: (2-phenyl-4-methyl-5-hydroxymethyl-imidazole manufactured by Shikoku Chemicals Corporation)

"Novacure (registered trademark)" HX3748: (microencapsulated imidazole compound manufactured by Asahi Kasei E-materials Corporation)

"Amicure (registered trademark)" VDH: (hydrazide compound manufactured by Ajinomoto Fine-Techno Co., Ltd.)

Perbutyl D: (organic peroxide manufactured by NOF Corporation)

(Thickener Particles)

"Zefiac (registered trademark)" F320: (alkyl methacrylate polymer), average polymerization degree 30,000, manufactured by Aika Kogyo Co., Ltd.)

"Zefiac (registered trademark)" F325: (alkyl methacrylate polymer), average polymerization degree 4,000, manufactured by Aika Kogyo Co., Ltd.)

"Zefiac (registered trademark)" F351: (acrylic copolymer having a core-shell structure) manufactured by Aika Kogyo Co., Ltd.)

(Others: Flame Retardant)

PX-200: (resorcinol bis (di-2,6-xylyl) phosphate, content of phosphorus: 9.0% by mass, manufactured by Daihachi Chemical Industry Co., Ltd.)

SPB-100: (phosphonitrilic acid phenyl ester, content of phosphorus: 13.4% by mass, manufactured by Otsuka Chemical Co., Ltd.)

(Others: Inorganic Filler)

THIXOTROPIC AGENT DT-5039 (manufactured by Huntsman Japan K.K.)

(Others: Internal Releasing Agent)

"MOLD WIZ (registered trademark)" INT1846 (manufactured by AXEL PLASTICS RESEARCH LABORATORIES INC.)

Licowax E (manufactured by Clariant Japan Co., Ltd.)

(Others: Thermoplastic Resin Particles)

E2020P particles: particles obtained by grinding polyether sulfone (trade name: Ultra zone E2020P manufactured by BASF SE, mass average molecular weight: 32,000) so as to have an average particle diameter of 10 μm Examples 1-16, Comparative Examples 1-7

(1) Preparation of Heat-Curable Resin Composition

A predetermined amount of a heat-curable resin was added into a kneader at a ratio described in Tables 1 to 4. The temperature was raised to 150° C. while the heat-curable resin was kneaded, and a solid component was completely dissolved. Thereafter, the temperature was lowered to a temperature of 60° C. while the heat-curable resin was kneaded. A curing agent, thickener particles, and the like were added at a ratio described in Tables 1 to 4. The resulting mixture was stirred for 30 minutes, and was thereby dispersed uniformly to obtain a heat-curable resin composition.

(2) Gel Time of Heat-Curable Resin Composition

As a sample, 3 g of the heat-curable resin composition was prepared. The gel time was measured at a temperature of 150° C. using a curelastometer IIF-120 (manufactured by JSR Trading Co., Ltd.) in order to track curing of a resin.

(3) Evaluation of Viscosities of Heat-Curable Resin Mixture and Heat-Curable Resin Composition A rheometer ARES-RDA manufactured by Rheometrics Inc. was used. The thickness of the resin between parallel plates each having a diameter of 25 mm was 0.5 mm. The viscosity was measured up to 180° C. at a temperature rising rate of 2° C./min at an angular velocity of 10 rad/sec. The lowest viscosity R and the viscosity of the heat-curable resin composition at 50° C. were measured using the obtained temperature-viscosity curve.

For the viscosity S obtained after the heat-curable resin mixture was held at 150° C. for 30 seconds, the viscosity was measured after the heat-curable resin mixture was held at 150° C. for 30 seconds after the temperature was raised to 150° C. at a temperature rising rate of 40° C./min at an angular velocity of 10 rad/sec using a rheometer ARES-RDA manufactured by Rheometrics Inc. with a thickness of a resin of 0.5 mm between the parallel plates each having a diameter of 25 mm.

(4) Production of Prepreg

A prepreg was produced as follows. The heat-curable resin composition obtained above was applied onto release paper using a reverse roll coater to produce a resin film having a mass per unit area of 50 g/m$^2$. Subsequently, the carbon fibers were arranged in one direction such that a fiber mass per unit area was 200 g/m$^2$ to produce a sheet-shaped reinforced fiber material layer. The above resin films were stacked on both surfaces of this reinforced fiber material layer and were heated and pressurized at a temperature of 95° C. and a pressure of 0.2 MPa to produce a unidirectional prepreg having a carbon fiber content of 67% by mass.

(5) Measurement of Resin Flow Amount (%) in Prepreg

The prepreg obtained above was cut into a size of 150 mm×150 mm to obtain a prepreg laminate having five layers of 0°/90°/0°/90°/0° laminated. An upper molding die of a molding die and a lower molding die thereof were heated to 150° C. in advance. The above prepreg laminate was disposed on the lower molding die, and the upper molding die was put down immediately to close the molding die. The resin in the prepreg was heated and thickened by holding the pressure at 0.1 MPa for 30 seconds. Thereafter, the prepreg laminate was cured by being heated and pressurized at a pressure of 2 MPa for five minutes. Subsequently, a molded product was taken out of the molding die to obtain an FRP. The mass before and after molding was measured, and a resin flow amount (%) in the prepreg was calculated.

W1: mass of prepreg laminate before molding (g)

W2: mass of molded product after molding (after removal of burr of resin) (g)

Resin flow amount (%) in prepreg=(W1−W2)/W1×100

(6) Measurement of Internal Defect of an FRP and Judgement Thereof

An FRP obtained after measurement of the resin flow in the prepreg was measured using a ultrasonic flaw detector (SDS-3600: manufactured by Nippon Clout Kramer Co., Ltd.) by a double transmission method at a frequency of 5 Hz and an amplification degree of 19 dB. An internal defect of an FRP was evaluated by calculating a ratio of a threshold 50% or less with respect to the measured area.

Judgement of Internal Defect

◯: very good: The ratio of a threshold 50% or less is less than 1.0%.

Δ: good: The ratio of a threshold 50% or less is 1.0% or more and less than 3.0%.

x: bad: The ratio of a threshold 50% or less is 3.0% or more.

TABLE 1

| | | | | Example 1 | Example 2 | Example 3 | Example 4 | Example 5 | Example 6 | Example 7 |
|---|---|---|---|---|---|---|---|---|---|---|
| heat-curable resin composition [A] | heat-curable resin mixture | epoxy resin | jER 154 | 65 | 65 | 60 | 65 | 80 | 40 | 65 |
| | | | jER 828 | | 15 | | | | | 15 |
| | | | jER 834 | 15 | | 30 | 5 | | 40 | |
| | | | jER 1001 | 20 | 20 | 10 | 30 | 20 | 20 | 20 |
| | | thickener particles | Zefiac F320 | 12 | 20 | 12 | 10 | 12 | 10 | 15 |
| | | | Zefiac F325 | | | | | | | |
| | | | Zefiac F351 | | | | | | | |
| | | viscosity of resin mixture S [Pa·S] | | 35 | 160 | 27 | 28 | 38 | 45 | 44 |
| | curing agent | Dicy7 | | 5 | 5 | 8 | 5 | | 6 | |
| | | Omicure 24 | | 4 | | | | | 5 | 5 |
| | | Omicure 52 | | | | | 6 | | | |
| | | DCMU-99 | | | | 5 | | | | |
| | | 2P4MHZ | | | | | | 5 | | |
| | | Novacure HX3748 | | | | | | | 30 | |
| | | Amicure VDH | | | | | | | | 13 |
| | other additives | DT-5039 | | | | | | | 4 | |
| | | PX-200 | | | | | | | | |
| | | SPB-100 | | | | | | | | |
| property of heat-curable resin composition [A] | | 50° C. viscosity [Pa·S] | | 120 | 230 | 98 | 310 | 740 | 250 | 340 |
| | | lowest viscosity R [Pa·S] | | 2 | 1.5 | 2.4 | 2.4 | 1.2 | 4 | 2.5 |
| | | S/R | | 18 | 107 | 11 | 12 | 32 | 11 | 18 |
| | | gel time [s] (150° C.) | | 70 | 70 | 55 | 70 | 55 | 60 | 50 |
| resin flow in prepreg [% by mass] (150° C.) | | | | 1 | 0.2 | 0.8 | 0.7 | 0.3 | 0.8 | 0.3 |
| internal defect of CFRP | | | | ○ | ○ | ○ | ○ | ○ | ○ | ○ |

TABLE 2

| | | | | Example 8 | Example 9 | Example 10 | Example 11 | Example 12 | Example 13 | Example 14 | Example 15 |
|---|---|---|---|---|---|---|---|---|---|---|---|
| heat-curable resin composition [A] | heat-curable resin mixture | epoxy resin | jER 154 | 65 | 65 | 60 | 60 | 60 | 40 | 35 | 20 |
| | | | jER 828 | | | | | | | | |
| | | | jER 834 | 15 | 15 | 25 | 25 | 30 | 40 | 40 | 50 |
| | | | jER 1001 | 20 | 20 | 15 | 15 | 10 | 20 | | |
| | | | YDCN-704 | | | | | | | 25 | 30 |
| | | thickener particles | Zefiac F320 | | | 12 | | 12 | 10 | 10 | 12 |
| | | | Zefiac F325 | 12 | 15 | | 15 | | | | |
| | | | Zefiac F351 | | | | | | | | |
| | | viscosity of resin mixture S [Pa·S] | | 30 | 35 | 34 | 30 | 27 | 45 | 44 | 48 |
| | curing agent | Dicy7 | | 8 | 6 | 8 | 8 | 8 | 6 | 5 | 7 |
| | | Omicure 24 | | | | | | | 5 | | 7 |
| | | Omicure 52 | | 6 | 5 | 6 | 6 | 6 | | 6 | |
| | other additives | DT-5039 | | | 4 | | | | 4 | 4 | 3 |
| | | PX-200 | | | | | 10 | | | | |
| | | SPB-100 | | | | 20 | 25 | | | | |
| | | INT1846 | | | | | | | | 1 | |
| | | Licowax E | | | | | | 1 | | | |
| property of heat-curable resin composition [A] | | 50° C. viscosity [Pa·S] | | 130 | 114 | 105 | 135 | 110 | 280 | 220 | 300 |
| | | lowest viscosity R [Pa·S] | | 2 | 3 | 1.5 | 1.5 | 2 | 4 | 4 | 6 |
| | | S/R | | 15 | 12 | 23 | 20 | 13 | 11 | 11 | 8 |
| | | gel time [s] (150° C.) | | 55 | 60 | 90 | 85 | 55 | 60 | 60 | 50 |
| resin flow in prepreg [% by mass] (150° C.) | | | | 0.5 | 0.5 | 1.5 | 1.5 | 0.8 | 0.9 | 0.8 | 0.7 |
| internal defect of CFRP | | | | ○ | ○ | Δ | ○ | ○ | ○ | ○ | ○ |

TABLE 3

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| heat-curable resin composition | heat-curable resin mixture | epoxy resin | jER 154 | 65 | 65 | 65 | 60 | 50 | 65 |
| | | | jER 828 | | | | 25 | | |
| | | | jER 834 | 15 | 15 | 15 | | | 5 |
| | | | jER 1001 | 20 | 20 | 20 | 15 | 25 | 30 |
| | | | YDCN-704 | | | | | 25 | |
| | | thickener particles | Zefiac F320 | | | | 35 | 10 | |
| | | | Zefiac F325 | | | | | | |
| | | | Zefiac F351 | | 12 | | | | |

TABLE 3-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
|  |  | viscosity of resin mixture S [Pa · S] | 0.2 | 0.2 | 4 | 350 | 110 | 8 |
|  | curing agent | Dicy7 | 5 | 5 | 5 | 6 | 5 | 5 |
|  |  | Omicure 24 | 4 | 4 | 4 | 5 | 5 |  |
|  |  | Omicure 52 |  |  |  |  |  |  |
|  |  | DCMU-99 |  |  |  |  |  | 4 |
|  |  | 2P4MHZ |  |  |  |  |  |  |
|  |  | Novacure HX3748 |  |  |  |  |  |  |
|  |  | Amicure VDH |  |  |  |  |  |  |
|  | other additives | DT-5039 |  | 5 |  | 2 | 5 |  |
|  |  | PX-200 |  |  |  |  |  |  |
|  |  | E2020P |  |  |  |  |  | 10 |
|  | property of heat-curable resin composition | 50° C. viscosity [Pa · S] | 92 | 140 | 103 | 350 | 1200 | 300 |
|  |  | lowest viscosity R [Pa · S] | 0.5 | 0.5 | 1 | 1.4 | 25 | 2.5 |
|  |  | S/R | 0.4 | 0.4 | 4 | 250 | 4.4 | 3.2 |
|  |  | gel time [s] (150° C.) | 70 | 70 | 70 | 60 | 65 | 80 |
| resin flow in prepreg [% by mass](150° C.) |  |  | 9.5 | 9 | 8.5 | 0.8 | 0.7 | 8 |
| internal defect of CFRP |  |  | x | x | x | x | x | x |

TABLE 4

|  |  |  |  | Example 16 | Comparative Example 7 |
|---|---|---|---|---|---|
| heat-curable resin composition | heat-curable resin mixture | vinyl ester resin | Neopol 8026 | 60 | 50 |
|  |  |  | Ripoxy V-60 | 40 | 50 |
|  |  | thickener particles | Zefiac F320 | 20 |  |
|  |  | viscosity of resin mixture S [Pa · S] |  | 35 | 1.5 |
|  | curing agent | Perbutyl D |  | 3 | 3 |
|  | other additives | DT-5039 |  | 3 | 3 |
|  | property of heat-curable resin composition | 50° C. viscosity [Pa · S] |  | 250 | 120 |
|  |  | lowest viscosity R [Pa · S] |  | 2.5 | 0.5 |
|  |  | S/R |  | 14 | 3 |
|  |  | gel time [s] (150° C.) |  | 120 | 130 |
| resin flow in prepreg [% by mass] (150° C.) |  |  |  | 2 | 9 |
| internal defect of CFRP |  |  |  | ○ | x |

Example 17

Figure 3:
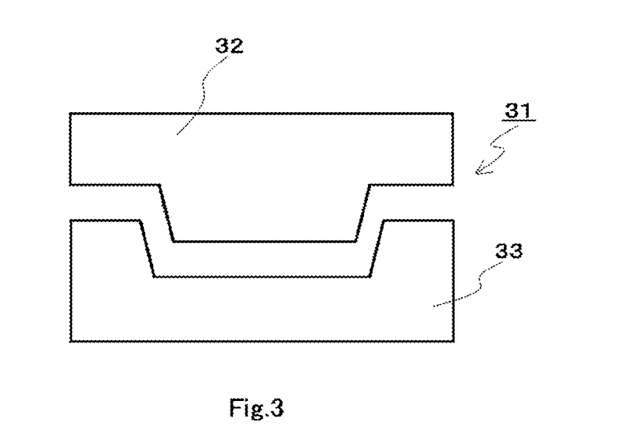
FIG. 3 is an explanatory diagram exemplifying a molding die used for press molding.
Figure 6:
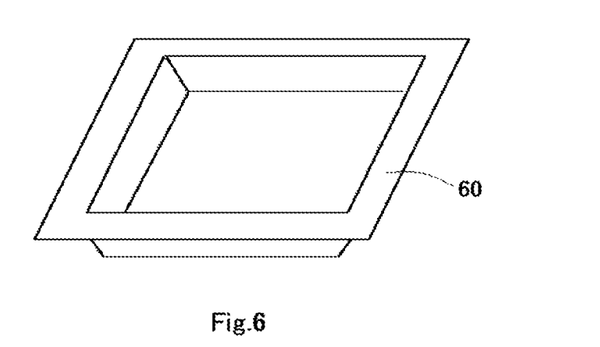
FIG. 6 exemplifies a shape of an FRP.

FIG. 3 illustrates a molding die for molding a tray-shaped FRP described in FIG. 6 by a press mold method. The sign 31 indicates a molding die, the sign 32 indicates an upper molding die, and the sign 33 indicates a lower molding die. First, the unidirectional prepreg obtained in Example 1 was cut into a size of 300 mm×300 mm, and five layers of 0°/90°/0°/90°/0° were laminated to obtain a prepreg laminate. The upper molding die 32 of the molding die 31 and the lower molding die 33 thereof were heated to 150° C. in advance. The above prepreg laminate was disposed on the lower molding die 33, and the upper molding die 32 was put down immediately to close the molding die 31. The resin in the prepreg was thickened by holding the prepreg laminate at 0.1 MPa for 15 seconds. Thereafter, the prepreg laminate was cured by being heated and pressurized at a pressure of 2 MPa for five minutes. An FRP (FIG. 6) taken out of the molding die had no fiber disorder on a surface thereof or no void, and had excellent appearance.

Example 18

Figure 4:
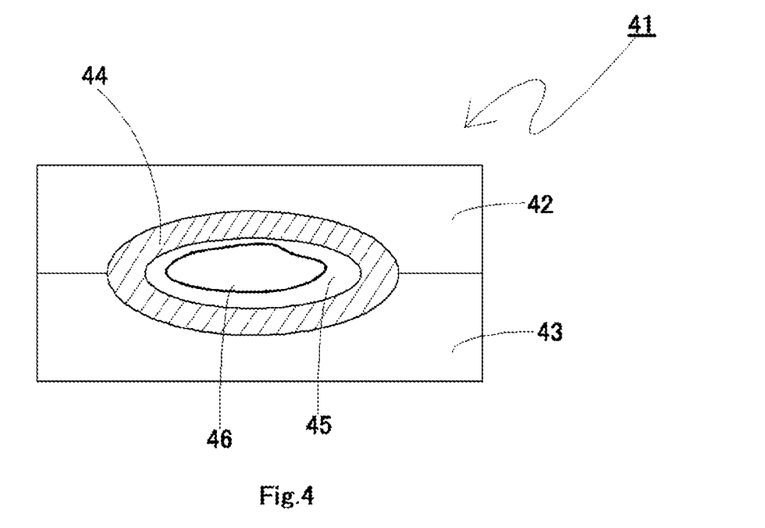
FIG. 4 is an explanatory diagram exemplifying a molding die used for inner pressure molding.

FIG. 4 illustrates a molding die for molding an elliptical pipe-shaped FRP by inner pressure molding. In FIG. 4, the sign 41 indicates a molding die, the sign 42 indicates an upper molding die, and the sign 43 indicates a lower molding die.

The prepreg obtained in Example 1 was cut into a size of 200 mm in width×300 mm in length, and five layers of 0°/90°/0°/90°/0° were laminated into an elliptical pipe-shape to obtain a hollow preform 44. A bag-shaped nylon inner pressure bag 46 was disposed in an inside 45 of the preform 44. The molding die 41 was heated to 150° C. in advance. The preform 44 including the inner pressure bag 46 was disposed on the lower molding die 43, and the upper molding die 42 was put down immediately for clamping. Thereafter, an air pressure of 0.5 MPa was added into the inner pressure bag 46, and the preform 44 was cured by being heated and pressurized in this state for five minutes. A molded product was taken out of the molding die, and the inner pressure bag was removed to obtain an elliptical pipe-shaped FRP. The resulting FRP had no fiber disorder on a surface thereof or no void, and had excellent appearance.

Example 19

Figure 5:
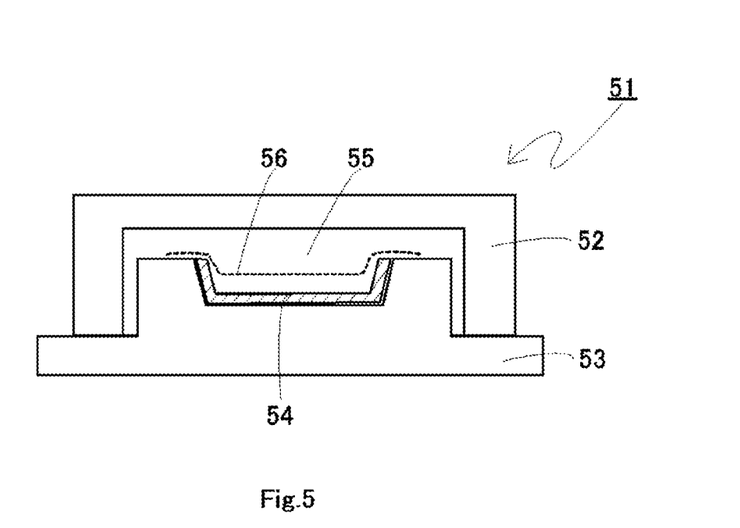
FIG. 5 is an explanatory diagram exemplifying a molding die used for vacuum assist-pressure molding.

FIG. 5 illustrates a molding die for molding a tray-shaped FRP described in FIG. 6 by a vacuum assist-pressure molding method. In FIG. 5, the sign 51 indicates a molding die for inner pressure molding, the sign 52 indicates an upper molding die, and the sign 53 indicates a lower molding die. The unidirectional prepreg obtained in Example 1 was cut into a size of 300 mm×300 mm, and five layers of 0°/90°/0°/90°/0° were laminated on the lower molding die 53 of the molding die 51 to obtain a prepreg laminate 54. Thereafter, a nylon film bag 56 was stacked on the prepreg laminate 54 to seal the prepreg laminate 54 between the lower molding die 53 and the film bag 56. Subsequently, a space formed by the lower molding die 53 and the film bag 56 was vacuumed. Thereafter, the upper molding die 52 and the lower molding die 53 were disposed on a heat plate press heated to 160° C., and were clamped with a press apparatus. The air was introduced into a space 55 between the upper molding die 52 and the lower molding die 53, and a pressure of 0.5 MPa was applied thereto. The prepreg laminate 54 was cured by being heated and pressurized in this state at 150° C. for five minutes. A molded product was taken out of the molding die, and the film bag 56 was removed to obtain a tray-shaped FRP (FIG. 6). The resulting FRP had no fiber disorder on a surface thereof or no void, and had excellent appearance.

Example 20

The unidirectional prepreg obtained in Example 1 was subjected to longitudinal fiber-separation so as to have a width of 6 mm, and was cut so as to have a fiber length of 50 mm to produce a short fiber prepreg. This short fiber prepreg was sprayed on a plane to produce a mat-like short fiber prepreg. A mat-like short fiber prepreg was produced. The mat-like short fiber prepreg was adjusted so as to have a mass per unit area of 2500 g/m², and was cut into a size of 250 mm×250 mm.

The upper molding die 32 of the molding die 31 in FIG. 3 and the lower molding die 33 thereof were heated to 150° C. in advance. The above mat-like short fiber prepreg was disposed on the lower molding die 33, and the upper molding die 32 was put down immediately to close the molding die. The resin in the prepreg was heated and thickened by holding the prepreg at 0.5 MPa for 10 seconds. Thereafter, the prepreg was cured by being heated and pressurized at a pressure of 5 MPa for five minutes. An FRP (FIG. 6) taken out of the molding die had the resin flowing up to an end of the short fiber prepreg, had no void, and had excellent appearance.

REFERENCE SIGNS LIST

11, 13, 15, 17, 19 temperature
12 viscosity curve of heat-curable resin mixture
14 viscosity curve of heat-curable resin (a)
16 viscosity curve indicating a change in viscosity of conventionally known mixture including heat-curable resin (a) and other thermoplastic resin particles
20 viscosity curve of heat-curable resin composition [A]
22 viscosity curve of resin composition in related art
31 molding die for press molding
32 upper molding die
33 lower molding die
41 molding die for inner pressure molding
42 upper molding die
43 lower molding die
44 preform
45 cavity
46 inner pressure bag
51 molding die for inner pressure molding
52 upper molding die
53 lower molding die
54 prepreg laminate
55 cavity
56 film bag
60 molded product

The invention claimed is:
1. A heat-curable resin composition comprising:
  (1) a heat-curable resin mixture containing a heat-curable resin (a) formed of an epoxy resin and thickener particles (b) dispersed in the heat-curable resin (a) and having a content of 8 to 20 parts by mass with respect to 100 parts by mass of the heat-curable resin (a), and exhibiting a viscosity S as a viscosity (150° C.) obtained after the heat-curable resin mixture is held at a temperature of 150° C. for 30 seconds, and
  (2) a curing agent having a content of 7 to 20 parts by mass with respect to 100 parts by mass of the heat-curable resin (a),
wherein
  the heat-curable resin composition exhibits a lowest viscosity R at a temperature of 80 to 120° C., and the lowest viscosity R is from 0.5 to 8 Pa·s,
  the viscosity S and the lowest viscosity R satisfy the following formula (1)

$$8 \leq S/R \leq 107 \quad \text{formula (1)},$$

the thickener particles (b) are capable of increasing the viscosity of the heat-curable resin composition by 10 times or more, measured at 150° C. after the heat-curable mixture is held at 150° C. for 30 seconds, when the thickener particles (b) are contained in the composition with 10% by mass,
  the thickener particles (b) do not have core-shell structure,
  the curing agent contains dicyandiamide and an urea curing agent selected from phenyl dimethyl urea and toluene bis-dimethyl urea,
  a gel time of the heat-curable resin composition is from 40 to 200 seconds at a temperature of 150° C., and
  the viscosity of the heat-curable resin composition is from 70 to 700 Pa·s at a temperature of 50° C., and the thickener particles (b) are formed of a polymer constituted by one or more polymerization units selected from the group consisting of a methacrylate compound, an acrylate compound, and a vinyl compound.

2. The heat-curable resin composition according to claim 1, wherein the viscosity S is from 15 to 250 Pa·s.

3. A prepreg comprising: a reinforced fiber material; and the heat-curable resin composition according to claim 1, wherein the reinforced fiber material is impregnated with a part of the heat-curable resin composition or the heat-curable resin composition in its entirety.

4. The prepreg of claim 3, wherein the reinforced fiber material is a mat formed of short fibers having a fiber length of 5 to 100 mm.

5. A method for producing a fiber-reinforced composite, comprising: heating and pressurizing the prepreg according to claim 3 in a molding die at a temperature of 130 to 170° C. at a pressure of 0.2 to 10 MPa for 1 to 10 minutes.

6. A method for producing a fiber-reinforced composite, comprising:
  stacking the prepreg of claim 3 outside a bag-shaped inner pressure bag to obtain a preform having the inner pressure bag therein;
  disposing the preform in a molding die; and
  heating and pressurizing the preform in the molding die at a temperature of 130 to 170° C. at a pressure of 0.2 to 2 MPa for 1 to 10 minutes.

7. A method for producing a fiber-reinforced composite; comprising:

stacking the prepreg of claim 3 and a film bag in a molding die sequentially to seal the prepreg between the molding die and the film bag;

vacuuming a space formed by the molding die and the film bag; and pressurizing an inside of a cavity of the molding die formed by clamping the molding die with the air so as to have a pressure of 0.2 to 2 MPa, heating the prepreg to 130 to 170° C. at a temperature rising rate of 2 to 100° C./min in the molding die, and heating and pressurizing the prepreg at the temperature for 1 to 10 minutes.

\* \* \* \* \*